(12) United States Patent
Burks (10) Patent No.: US 6,378,010 B1
(45) Date of Patent: Apr. 23, 2002

(54) SYSTEM AND METHOD FOR PROCESSING COMPRESSED AUDIO DATA

(75) Inventor: David Burks, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/371,329

(22) Filed: Aug. 10, 1999

(51) Int. Cl.[7] .............................................. G06F 13/00
(52) U.S. Cl. ............................ 710/68; 710/74; 700/94; 704/500; 704/503
(58) Field of Search ............................ 710/65–68, 102; 704/500–504; 700/94; 369/59; 380/28–30

(56) References Cited

U.S. PATENT DOCUMENTS

| | | | | |
|---|---|---|---|---|
| 5,557,541 A | * | 9/1996 | Schulhof et al. | 364/400.01 |
| 5,572,442 A | * | 11/1996 | Schulhof et al. | 709/219 |
| 5,732,266 A | | 3/1998 | Moore et al. | 395/651 |
| 5,734,787 A | | 3/1998 | Yonemitsu et al. | 386/111 |
| 5,764,774 A | | 6/1998 | Liu | 380/49 |
| 5,798,995 A | * | 8/1998 | Fukushima et al. | 369/59 |
| 5,799,212 A | * | 8/1998 | Ohmori | 710/73 |
| 5,870,756 A | | 2/1999 | Nakata et al. | 707/200 |
| 5,905,800 A | | 5/1999 | Moskowitz et al. | 380/28 |
| 6,131,192 A | * | 10/2000 | Henry | 717/11 |
| 6,134,243 A | * | 10/2000 | Jones et al. | 370/465 |
| 6,229,954 B1 | * | 5/2001 | Yamagami et al. | 386/117 |

FOREIGN PATENT DOCUMENTS

GB          2344925        *  6/2000

* cited by examiner

Primary Examiner—Christopher B. Shin (57) ABSTRACT

A processing system retrieves selected compressed audio data from a compact disc and produces sound based on the retrieved data. In this regard, the processing system utilizes a disc storage mechanism, a processing element, a system manager, and an audio output device. A compact disc is inserted into the disc storage mechanism. The system manager receives inputs from a user and, in response to the user inputs, reads organizational structure information stored on the compact disc. Based on the inputs and the organizational structure information, the system manager identifies a set of compressed data stored on the compact disc. The system manager retrieves instructions of a decompression application from the compact disc and transmits these instructions to the processing element. The processing element executes the received instructions, thereby decompressing the set of compressed data into uncompressed data. The uncompressed data is transmitted to the audio output device, which produces sound based on the uncompressed data.

20 Claims, 4 Drawing Sheets

SYSTEM AND METHOD FOR PROCESSING COMPRESSED AUDIO DATA

BACKGROUND OF THE INVENTION

1. Field of the Invention

The present invention generally relates to data processing techniques and, in particular, to a system and method for processing compressed audio data stored on a removable storage medium, such as a compact disc, for example.

2. Related Art

Many computer systems have the capability of receiving music data stored in compressed audio data files and of playing the music defined by the received audio data files. In this regard, these computer systems usually include a decompression application stored in the computer system's memory. When the music defined by a compressed audio data file is to be played, the computer system invokes the decompression application, which decompresses the audio data file. After decompressing, the audio data file is compatible with conventional audio output devices capable of producing sound based on the uncompressed audio data.

Consequently, compressed audio data can be downloaded from the Internet, for example, and played by a user's computer system. However, certain security issues arise pertaining to the transfer of audio data by computer systems. In this regard, most computer systems have the capability of not only playing the music downloaded from an external source, such as the Internet, for example, but also have the capability of copying the audio data. Therefore, it is possible to download audio data and to create many unauthorized copies of the audio data.

Unlike the computer systems described above, most portable compact disc (CD) players do not have the capability of decompressing audio data files. In this regard, portable CD players are designed to be small and lightweight to facilitate transportation and, therefore, do not include user interface devices (such as a mouse, a keyboard or a screen display) and/or other types of components for selecting and downloading decompression applications. It is possible to store decompression applications in the CD player during manufacturing of the CD player. However, due to the vast number of decompression techniques, storing decompression applications in the CD player during manufacturing could significantly increase the cost of the CD player. In this regard, additional ROM space may be added to the CD player to accommodate the decompression applications, or the decompression applications may be implemented in silicon. Each of these options increases the cost of manufacturing, and it would be desirable to avoid these costs, if possible.

In addition, even if decompression applications are stored in the CD players during manufacturing, compatibility with audio data files is not guaranteed, as the audio data files may be compressed via new techniques or via techniques incompatible with the decompression applications selected for storage. As a result, most portable CD players are not designed to decompress audio data. Instead, most portable CD players only process CDs having data stored in CD-DA (compact disc-digital audio) format, which is an uncompressed format. Consequently, the efficiencies pertaining to the storage of compressed data versus uncompressed data are not realized by most portable CD players.

Thus, a heretofore unaddressed need exists in the industry for providing a system and method of processing audio data such that security of the data can be enhanced and such that portable systems, such as portable CD players, can receive and process compressed data.

SUMMARY OF THE INVENTION

The present invention overcomes the inadequacies and deficiencies of the prior art as discussed hereinbefore. Generally, the present invention provides a system and method for processing compressed audio data stored on removable storage media.

The present invention utilizes a processing element, a system manager, and an audio output device. The system manager receives inputs from a user and, in response to the user inputs, reads organizational structure information stored on a removable storage medium, such as a compact disc, for example. Based on the inputs and the organizational structure information, the system manager identifies a set of compressed data stored on the removable storage medium. The system manager retrieves instructions of a decompression application from the removable storage medium and transmits these instructions to the processing element. The processing element executes the received instructions, thereby decompressing the set of compressed data into uncompressed data. The uncompressed data is transmitted to the audio output device, which produces sound based on the uncompressed data.

In accordance with another feature of the present invention, the organizational structure information includes at least one play list that indicates a correspondence between a plurality of songs defined by the data stored on the removable storage medium. When desired, the system manager retrieves these songs and includes these songs in the set of compressed data identified by the system manager.

In accordance with another feature of the present invention, a compiler is used to translate the instructions of the decompression application retrieved from the removable storage medium into a form compatible with the processing element. Therefore, the decompression application can be stored in a relatively high level to increase the number of processing elements that can execute the instructions of the decompression application. If desired, a dedicated processing element can be used to compile the decompression application.

The present invention can also be viewed as providing a method for processing compressed audio data stored on removable storage media. The method can be broadly conceptualized by the following steps: receiving a removable storage medium; receiving inputs form a user interface device; reading organizational structure information stored on the removable storage medium; retrieving a set of compressed data from the removable storage medium based on the inputs and the organizational structure information; retrieving a decompression application from the removable storage medium; decompressing the set of data via the decompression application to form an uncompressed set of data; and producing sound based on the uncompressed set of data.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are

DETAILED DESCRIPTION OF THE PREFERRED EMBODIMENT

The present invention generally relates to a processing system capable of playing music defined by compressed data stored on a compact disc (CD) or other type of storage media. Preferably, the processing system is capable of processing data stored in any compressed audio format. Therefore, different types of compression schemes and security features may be used to store the data on the CD, even if the particular types of schemes and features were not contemplated when the processing system was designed.

Figure 1:
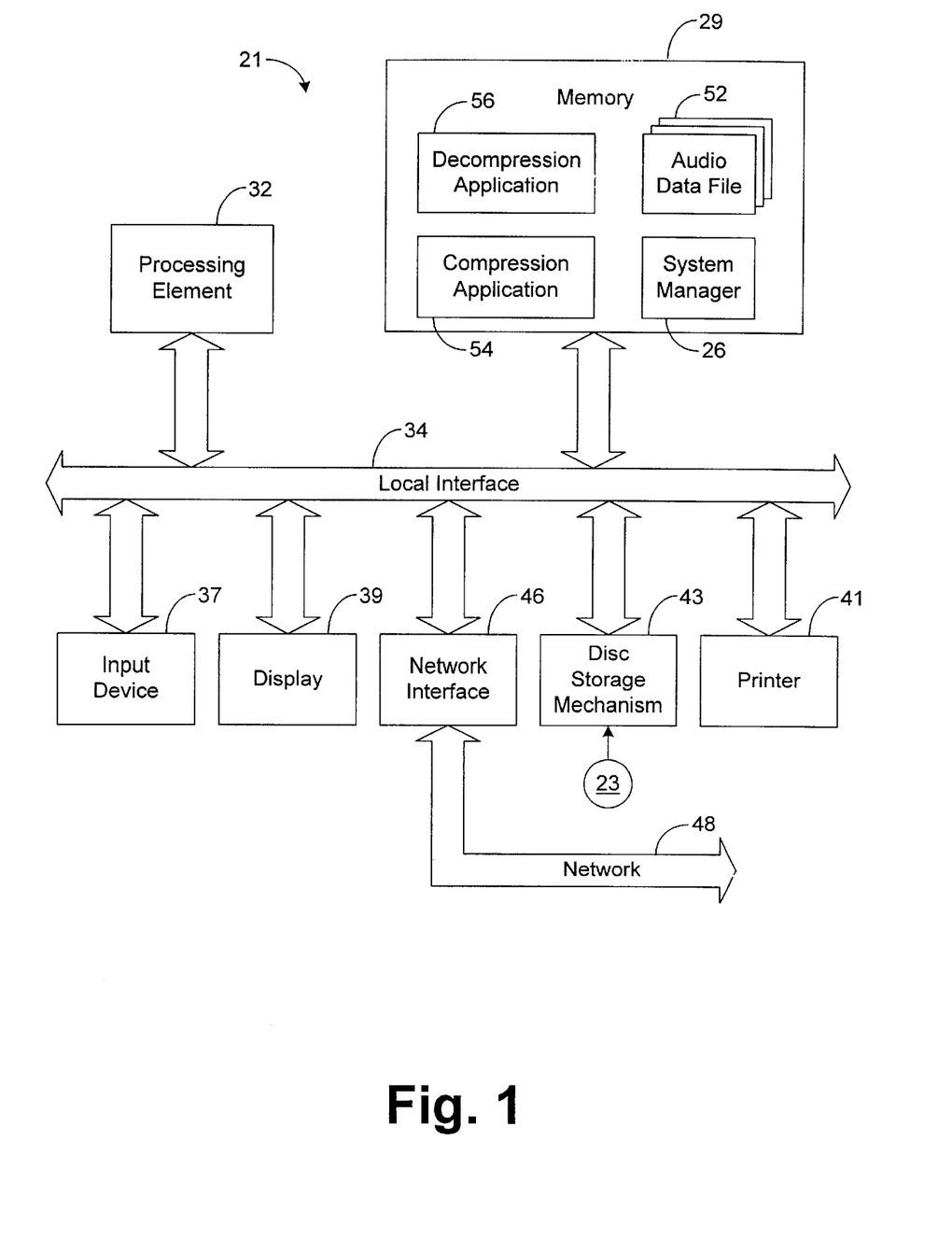
FIG. 1 is a block diagram illustrating a computer system that may be used to store audio data onto a removable storage medium, such as a compact disc.

FIG. 1 depicts a computer system 21 that may be used to store data onto a compact disc (CD) 23, or other type of removable storage media, according to the principles of the present invention. As used herein, a "removable storage medium" is any medium that may have data stored thereon and that may be transferred to and interfaced with various computer systems such that the various computer systems may read from and/or write to the medium.

The system 21 of FIG. 1 includes a system manager 26 configured to control the operation of the system 21. The system manager 26 can be implemented in software, hardware, or a combination thereof. In the preferred embodiment, as illustrated by way of example in FIG. 1, the system manager 26 of the present invention along with its associated methodology is implemented in software and stored in computer memory 29 of computer system 21.

The preferred embodiment of the computer system 21 of FIG. 1 also comprises one or more conventional processing elements 32, such as a microprocessor in the 680×0 family from Motorola Corp., U.S.A., or the 80×86 family from Intel Corp., U.S.A., for example, that communicate to and drive the other elements within the system 21 via a local interface 34, which can include one or more buses. Furthermore, an input device 37, for example, a keyboard or a mouse, can be used to input data from a user of the system 21, and screen display 39 or a printer 41 can be used to output data to the user. A disc storage mechanism 43 can be connected to the local interface 34 to transfer data to and from a nonvolatile disc (e.g., magnetic, optical, etc.). The system 21 can be connected to a network interface 46 that allows the system 21 to exchange data with a network 48.

Memory 29 also includes audio data files 52, a compression application 54, and a decompression application 56. Each audio data file 52 preferably includes data that defines music, such as a song or a plurality of songs, for example. The audio data files 52 may be stored in an universal disc format (UDF), although other types of formats are possible, and the data in the audio data files 52 can be uncompressed or decompressed. The audio data files 52 can be originally interfaced with the system 21 via many different sources. For example, the audio data files 52 may be read from a disc in disc storage mechanism 43, or the audio data files 52 may be downloaded from a network 48, such as the Internet or other type of network.

When desired, the system manager 26 is configured to store selected audio data files 52 onto the CD 23 inserted in disc storage mechanism 43. In this regard, a user may input, via input device 37, a request to download selected ones of the audio data files 52. In response, the system manager 26 retrieves the selected audio data files 52 from memory 29 and stores these audio data files 52 onto CD 23.

Preferably, the audio data files 52 are in a compressed format when stored onto CD 23, although it is possible to store the audio data files 52 onto CD 23 in an uncompressed format. Therefore, if the audio data files 52 in memory 29 are in an uncompressed format, the system manager 26 is designed to invoke compression application 54 before transmitting the audio data files 52 to CD 23. When invoked, the compression application 54 is designed to compress the data in the audio data files 52 through conventional techniques. If desired, different types of compression applications 54 may be used to compress the audio data files 52. Once the audio data files 52 have been compressed, the system manager 26 is configured to store the selected audio data files 52 onto CD 23.

In addition to storing data from the selected audio data files 52 onto CD 23, the system manager 26 is further designed to store a decompression application 56 that includes the necessary instructions for decompressing data from the audio data files 52. If more than one type of compression technique was used to compress the selected audio data files 52, then more than one decompression application 56 may need to be stored. Therefore, the CD 23 includes not only data from the selected audio data files 52, but it also includes the instructions necessary to decompress this data.

The system manager 26 is also designed to produce organizational structure information 59 (FIG. 2) and to store the organizational structure information 59 on the CD 23. The organizational structure information 59 preferably indicates the location of the data from each of the audio data files 52 stored on the CD 23, including in particular the location of each song defined by the audio data files 52 stored on the CD 23. Furthermore, the organizational structure information 59 preferably includes data defining the title of each song defined by the audio data files 52 stored on the CD 23. Therefore, the organizational structure information 59 includes data that defines both the location and the title of each song stored on CD 23.

The organizational structure information 59 may also include data defining one or more play lists. A "play list" as used herein, is a set of data indicating one or more songs that are defined by the data stored on CD 23. In this regard, while selecting which audio data files 52 are to be stored on CD 23 by system 21, the user is preferably allowed to select which songs defined by the selected audio files 52 are to be included in a particular play list. For example, the user may desire to include each of his favorite songs, songs from a particular style of music (e.g., rock, jazz, country, etc.), or any other grouping of songs into a particular play list. The user enters inputs via input device 37 indicating which songs are to be included into the play list, and the system manager 25, in defining the organizational structure information 59, includes data in the organizational structure information 59 indicating which songs have been selected for inclusion into the play list. The organizational structure information 59 may define more than one play list, if desired.

The organizational structure information 59 may also indicate where the decompression applications 56 are stored in CD 23 and which decompression applications 56 should be used to decompress which data. To enable the organizational structure information 59 to be easily located, the system manager 26 in the preferred embodiment is designed to store the organizational structure information 59 in a predetermined location in the CD 23.

Note that the data from audio data files 52 may be stored on CD 23 in many different formats. For example, among other types of formats, the selected audio data files 52 may be stored on the CD 23 in UDF, or the data from the selected audio data files 52 may be stored in tracks defined on the CD 23, similar to CD-DA format. In this regard, in typical CD-DA format, tracks of data are defined on the CD 23. Each track usually contains the audio data necessary to play a particular song or songs, and conventional CD players have the capability of distinguishing and locating the tracks on the CD 23. Therefore, a user specifies which song he prefers, and the CD player determines which track on the CD 23 includes the data defining the selected song. Then, the CD player, using the track as a positional reference, retrieves this data and begins to play the music defined by the data.

Similarly, the audio data defining each audio data file 52 selected for storage on CD 23 can be stored in a track of the CD 23. Furthermore, the decompression application 56 needed to decompress the data in a track can either be stored in the track along with the audio data or can be stored in a separate track. Accordingly, it should be apparent to one skilled in the art that the audio data from data files 52 and the decompression applications 56 can be stored on CD 23 in a variety of formats.

Figure 2:
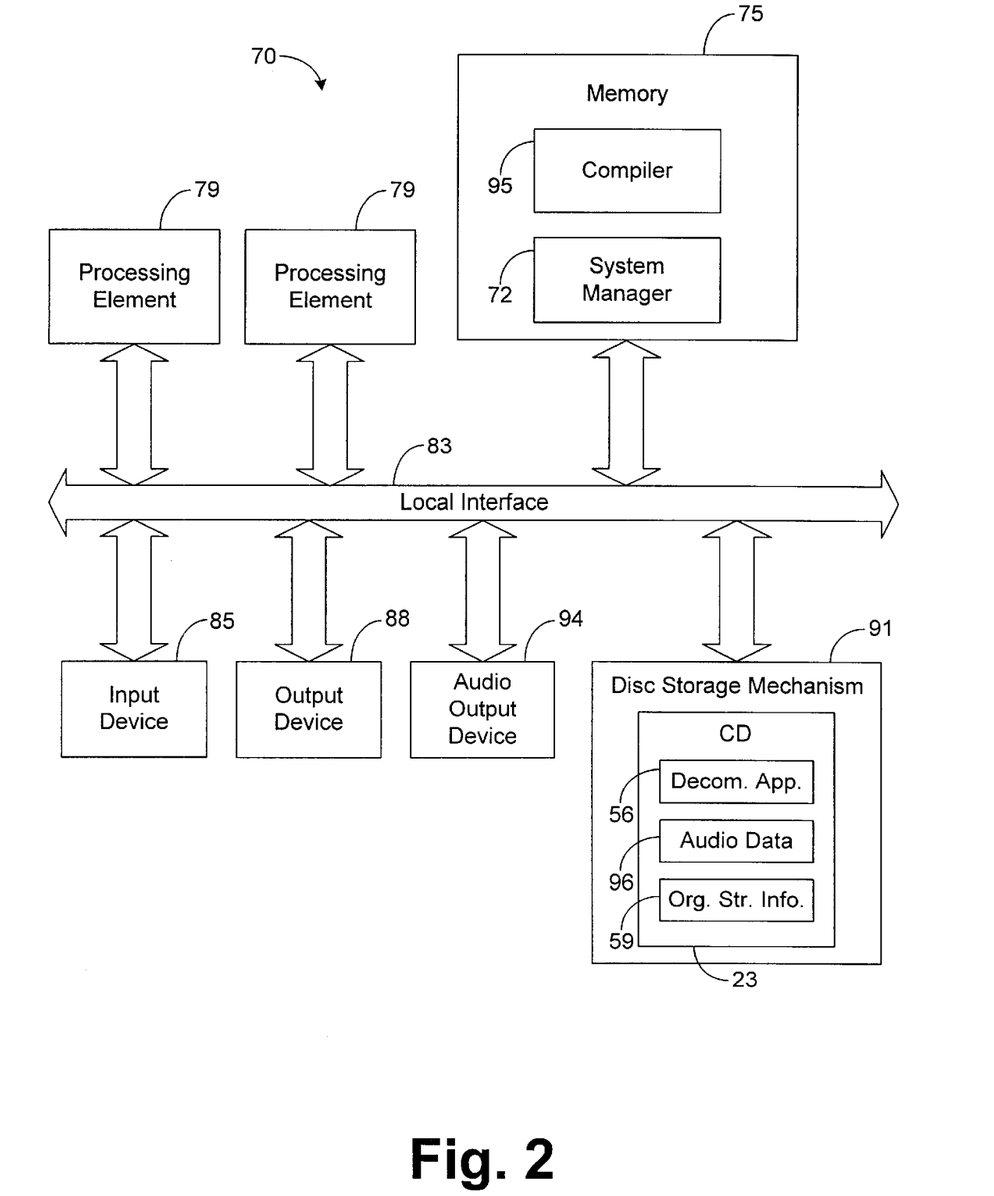
FIG. 2 is a block diagram illustrating a processing system that plays selected data stored on the storage medium of FIG. 1 in accordance with the principles of the first embodiment present invention.

After storing the data from selected audio data files 52, the decompression applications 56, and the organizational structure information 59 onto CD 23, the CD 23 may be removed from the system 21 and transported to a processing system 70, such as the one depicted in FIG. 2. In the preferred embodiment, the system 70 is a portable, stand-alone system and includes a system manager 72 configured to control the operation of the system 70. The system manager 72 can be implemented in software, hardware, or a combination thereof. In the preferred embodiment, as illustrated by way of example in FIG. 2, the system manager 72 of the present invention along with its associated methodology is implemented in software and stored in memory 75.

The preferred embodiment of the system 70 of FIG. 2 comprises one or more conventional processing elements 79, such as digital signal processors (DSPs), that communicate to and drive the other elements within the system 70 via a local interface 83, which can include one or more buses. Furthermore, an input device 85 can be used to input data from a user of the device 85, and an output device 88 can be used to output data to the user. The CD 23 is preferably inserted into a disc storage mechanism 91, which can be connected to the local interface 83 to transfer data to and from CD 23. The system 70 also includes an audio output device 94, such as an amplifier and speakers, for example, that may be used to play music from selected audio data stored in CD 23.

In this regard, similar to input devices of conventional CD players, the input device 85 may include buttons or other types of switches that enable a user to select a particular set of audio data 96 stored in CD 23. For example, the input device 85 may have a play button, a stop button, an advance to next selection button, and/or an advance to previous selection button. The output device 88 may include a display, such as a liquid crystal display, for example, that indicates the user's selection. For example, if there are ten sets of audio data to select from, then the output device 88 may display a number from one to ten, depending on which set of audio data 96 is currently selected via input device 85.

As used herein, a "set" of data refers to any logical grouping of data stored on CD 23. For example, when data is stored on CD 23 in UDF, a set of data may refer to a data file. A set of data may also refer to a song defined by the data stored on CD 23, and a set of data may refer to a particular play list. It should be noted that a set of data may refer to other types of logical groupings of data.

The user preferably manipulates the buttons or switches in the input device 85 to select a set of audio data 96 stored on CD 23. Selection of a set of audio data 96 may be accomplished in a variety of ways. For example, in one embodiment, the system manager 72 is designed to read the organizational structure information 59 when the CD 23 is loaded into the disc storage mechanism 91 to determine which songs or play lists are stored on CD 23. The system manager 72 then transmits data to output device 88 indicating which songs or play lists are stored on CD 23. The user then selects via input device 85 which one of the songs or play lists he desires to hear. If the user selects a particular song, the system 70 begins to play the selected song, and if the user selects a play list, the system 70 begins to sequentially play the songs associated with the selected play list.

To play a song selected by the user, the system manager 72 retrieves the data defining the song from CD 23 and transmits the retrieved data to audio output device 94, which produces sound signals based on the data. In this regard, the system manager 72 is designed to read the organizational structure information 59, which as previously described is stored at a predetermined location in CD 23. The system manager 72 is then designed to determine based on the organizational structure information 59 where the set of audio data 96 defining the selected song is located on CD 23 and where the decompression application 56 needed to decompress this data 96 is located on CD 23. Then, the system manager 72 is designed to retrieve the foregoing set of audio data 96 and decompression application 56 and to transmit the instructions included in the aforementioned decompression application 56 to at least one of the processing elements 79 for execution.

The execution of the instructions defined by the decompression application 56 decompresses the retrieved set of audio data 96 defining the selected song. Therefore, the system manager 72 does not need to be aware of how to decompress the selected data 96, since the instructions for decompressing the data 96 are included in the CD 23. When the user selects a play list, the system manager 72 is designed to read the organizational structure information 59 to determine which songs are included in the play list and to begin consecutively playing these songs according to the techniques described hereinabove.

It should be noted that it is possible to embed the decompression application 56 in the audio data stored on CD 23. For example, the beginning of each data file or track on CD 23 may include the decompression application 56 necessary to decompress the audio data stored in the remainder of the data file or track. Therefore, system manager 72 does not need to make a separate determination of the location of the decompression application 56, since the system manager 72 should be aware of the application's location by virtue of being aware of the location of the data file or track. Furthermore, the decompression application 56 can be stored at other predetermined locations on CD 23, and the system manager 72 can be configured to automatically retrieve the decompression application 56 from a predetermined location on CD 23 without consulting the organizational structure information 59.

The uncompressed data produced by execution of the decompression application 56 described above is transmitted by system manager 72 to audio output device 94. The audio output device 94 then produces sounds based on the received data. In this regard, the audio output device 94 may include an analog-to-digital converter, an amplifier, and speakers, among other devices and/or circuitry for producing sound signals based on the received data.

Furthermore, since the instructions for decompressing the set of audio data 96 are located on the same media (i.e., CD 23) as the set of audio data 96, it is possible to include many security features that would not otherwise be possible. For example, the audio data can be originally compressed via a unique or not commonly known compression technique. As an example, a seller who desires to sell the audio data to a buyer can compress the audio data via a compression technique of the seller's own design. Accordingly, widely used decompression applications 56 should not be able to properly decompress the audio data. Only decompression applications 56 provided by the seller should properly decompress the audio data.

As such, the seller includes the decompression application 56 along with the audio data (e.g., stores the decompression file 56 on the medium along with the audio data, transmits both the decompression file 56 and the audio data file 52 to the buyer over the Internet or other network, etc.). Furthermore, since the seller designed the compression techniques, the seller can implement watermarking techniques within the decompression application 56 to prevent the decompression application 56 from being copied more than a predetermined number of times. Consequently, the number of unauthorized copies that can be successfully made is limited.

Since the instructions for decompressing the audio data are located on the CD 23, the number of systems 70 capable of interfacing with the CD 23 may be limited. In this regard, the processing element 79 used to execute the decompression application 56 must be compatible with the instructions in the decompression application 56 unless the application 56 is capable of translating the instructions into a compatible form.

To increase the number of systems 70 compatible with the decompression application 56, the instructions defining the decompression application 56 are preferably stored on CD 23 in a relatively high level form, such as C, for example, which can be compiled into a lower level form compatible with a relatively large number of processors. Therefore, a compiler 95 is preferably stored in memory 75 that compiles the decompression application 56 into a form compatible with the processing element 79 before execution of the decompression application 56. Consequently, as long as the decompression application 56 is compatible with compiler 95, the system 70 is capable of interfacing with the CD 23 regardless of what type of processing element 79 is utilized by system 70 (provided, of course, that the compiler 95 is designed to translate code into a form compatible with processing element 79).

Compiling decompression file 56 may utilize a relatively large amount of processing power of the system 70, especially considering that the system 70 is portable and, therefore, of a relatively small size. Consequently, it may be advantageous to include at least two processing elements 79, as shown by FIG. 2, where one of the processing elements 79 is dedicated for compilation of applications 56 stored on the CD 23 and the other processing element 79 executes instructions pertaining to other functionality performed by the system 70. Alternatively, the two processors 79 may execute in parallel. However, parallel execution may require additional circuitry that would make the system 70 undesirably large.

Second Embodiment

Figure 3:
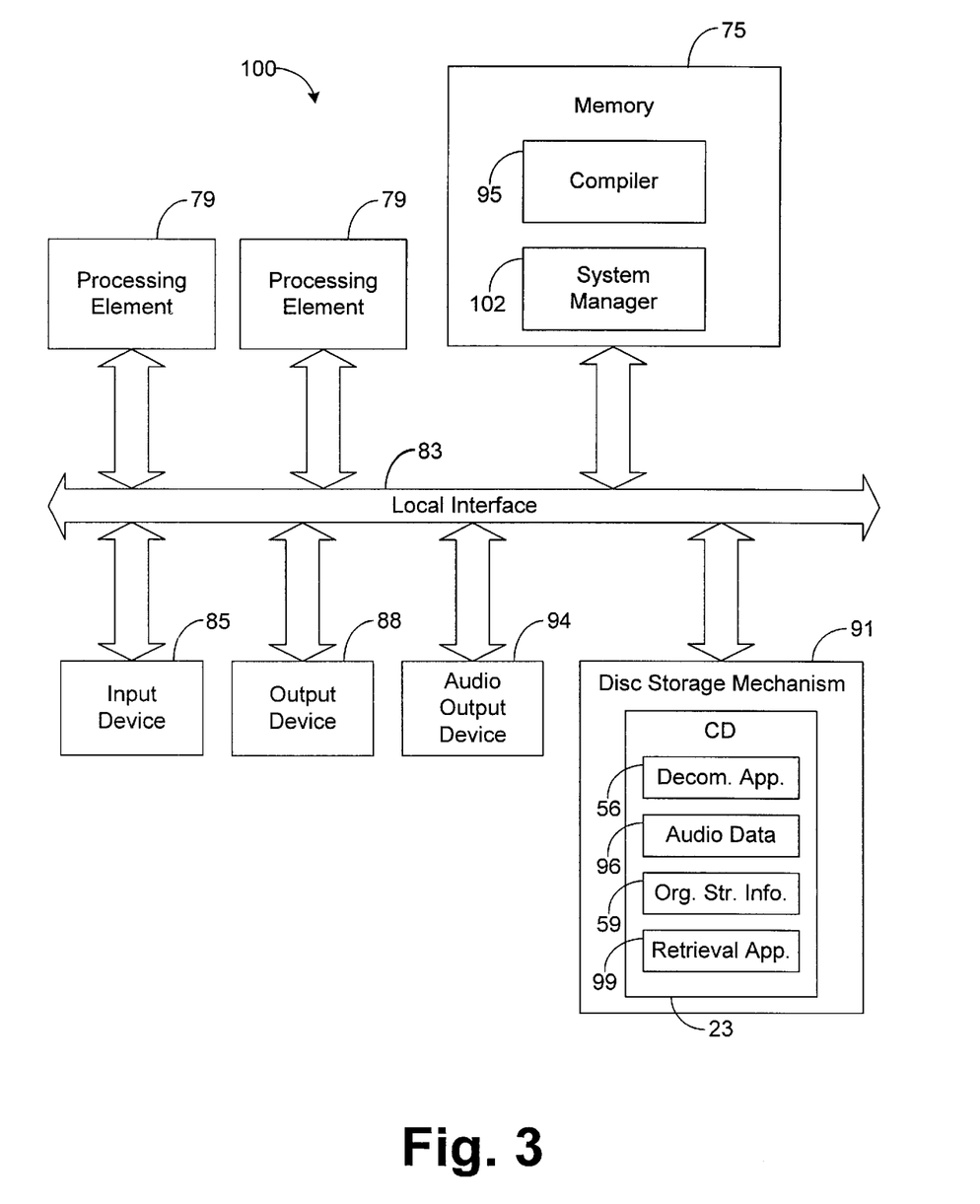
FIG. 3 is a block diagram illustrating a processing system that plays selected data stored on the storage medium of FIG. 1 in accordance with the principles of the second embodiment present invention.

In a second embodiment of the present invention, a retrieval application 99 is stored on the CD 23 in addition to the decompression application 56, the organizational structure information 59, and the audio data files 52, as shown by FIG. 3. In response to a request from input device 85 to play a set of data 96, the system manager 102 is designed to locate the retrieval application 99 and to transmit the data in retrieval application 99 to at least one of the processing elements 79. The retrieval application 99 includes instructions that, when executed, locates the selected set of audio data 96 based on the organizational structure information 59 and the input provided by the user via input device 85.

The retrieval application 99 is further designed to locate the decompression application 56 needed to decompress the selected set of audio data 96 based on the organizational structure information 59 and to invoke execution of this decompression application 56. Once the selected set of data 96 has been decompressed, the retrieval application 99 is configured to transmit the uncompressed data to the system 100. The system manager 102, in this embodiment is designed to receive the uncompressed data and to transmit this data to audio output device 94, which produces sound signals based on the received data.

Accordingly, the second embodiment is similar to the first embodiment except that the functionality of locating and retrieving the requested data in CD 23 is performed by the retrieval application 99 instead of the system manager 102. As shown by the foregoing embodiments, this functionality may be implemented by the system manager 72, the retrieval application 99, or a combination thereof The organizational structure information 59 may include data to indicate the location of the retrieval application 99 so that the system manager 102 is aware of where to retrieve the instructions to execute application 99. However, if the retrieval application 99 is locatable without accessing the organizational structure information 59, then it is not necessary for the organizational structure information 59 be stored in a predetermined location in CD 23. In such a case, it may be desirable to store the retrieval application 99 in a predetermined location so that it may be easily located.

It should be noted that, similar to decompression application 56, the retrieval application 99 may be stored in a relatively high level form requiring compilation by compiler 95. Therefore, it may be necessary for compiler 95 to compile the instructions defined by the retrieval application 99 before the instructions can be executed by either of the processing elements 79.

OPERATION

The preferred use and operation of the processing system 70 and associated methodology are described hereafter.

Initially, a user stores at least one set of audio data 96 on CD 23, or other type of media, via computer system 21 (FIG. 1) or some other type of system. As an example, the set of audio data 96 may define a song or songs selected by the user. In the preferred embodiment, the audio data is compressed, although it is possible to store uncompressed audio data, if desired. Then, the user also stores a decompression application 56 on the CD 23 via the computer system 21. The decompression application 56 includes instructions that decompress the audio data stored on CD 23 when executed. The computer system 21 is preferably configured to also store organizational structure information 59 on CD 23 indicating the locations on CD 23 of the sets of audio data 96 and the location of the decompression application 56. The audio data may be stored in any suitable format. For example, the audio data may be stored in UDF or in a format, similar to CD-DA, in which audio data is stored in tracks of CD 23.

The user removes the CD 23 from system 21 and transfers the CD 23 to processing system 70, which in the preferred embodiment is a portable CD audio system. Next, the user enters inputs via input device 85 requesting the system 70 to play a particular set of audio data 96 stored on CD 23. In response, the system manager 72 analyzes the organizational structure information 59 to determine where the selected set of audio data 96 is located and where the decompression application 56 needed to decompress the selected set of audio data 96 is located on CD 23 (assuming the decompression application 56 is not embedded in the set of data 96 as previously described), as shown by blocks 105 and 107 of FIG. 4.

Figure 4:
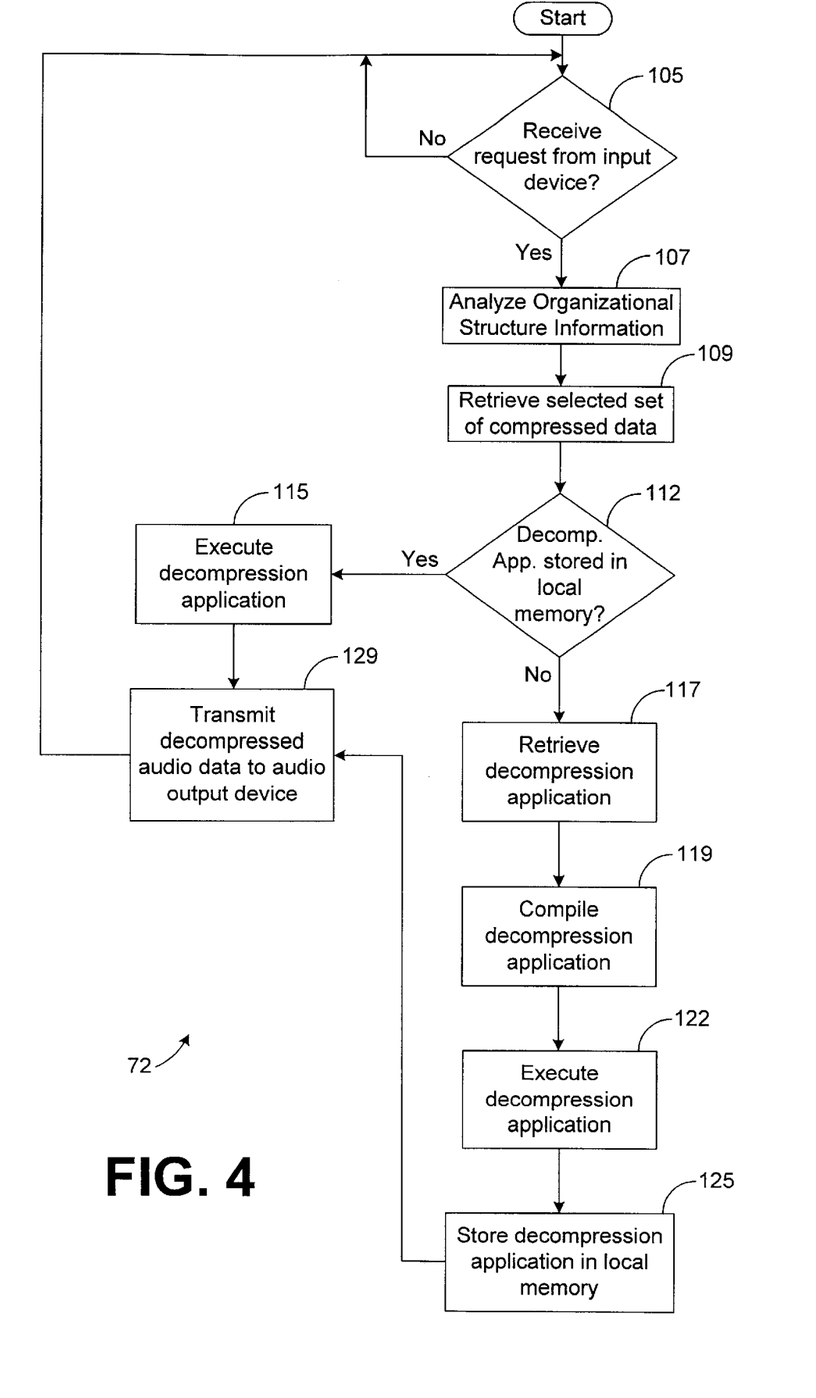
FIG. 4 is a flow chart illustrating the architecture and functionality of the system manager depicted in FIG. 2.

The system manager 72 then retrieves the selected set of audio data 96 from CD 23 in block 109 and determines in block 112 whether the decompression application 56 needed to decompress the selected set of audio data 96 has been stored in local memory 75. If so, the system manager 72, in block 115, transmits the instructions from the decompression application 56 stored in memory 75 to at least one of the processing elements 79, which executes the instructions to decompress the selected set of audio data 96.

If the decompression application 56 is not stored in local memory 75, the system manager 72 retrieves the decompression application 56 from CD 23 in block 117 and invokes the compiler 95 to compile the decompression application 56 in block 119. The system manager 72 then transmits the compiled instructions of the decompression application 56 to at least one of the processing elements 79 in block 122 to execute the decompression application 56. In block 125, the system manager 72 stores the compiled decompression application 56 in local memory 75 to reduce the mount of time needed to access the decompression application 56 in the future.

Execution of the decompression application 56 should put the selected set of data 96 into a form compatible with audio output device 94. In block 129, the system manager 72 transmits this data to audio output device 94, which through conventional techniques produces sound based on the received data. Therefore, the user is able to hear the music defined by the selected set of audio data 96. Since decompression of the selected set of audio data 96 is performed by decompression application 56, it is not necessary for the system manager 72 (or any other component of the system 70) to be aware of or be compatible with the compression format used to compress the set of audio data 96 stored on CD 23.

It should be noted that storing the decompression application 56 in local memory 75 is not a necessary feature of the present invention but helps to improve performance of the system 70 by decreasing the amount of time required to access the decompression application 56. Furthermore, if the instructions of the decompression application 56 are compatible with the processing elements 79 as stored on the CD 23, then step 117 is not necessary.

The operation of the second embodiment of the present invention is similar to the operation of the preferred embodiment. However, in the second embodiment, a retrieval application 99 is stored on CD 23 in addition to the decompression application 56 and the set or sets of audio data 96. Furthermore, in response to the user's request to play the selected set of audio data 96, the system manager 102 simply locates and invokes the retrieval application 99. In this regard, the system manager 102 transmits the instructions defined by the retrieval application 99 to at least one of the processing elements 79 for execution. If the retrieval application 99 is not in a form compatible with processing element 79, then system manager 102 invokes the compiler 95 to compile the instructions of the retrieval application 99 into a form compatible with processing element 79 before transmitting the instructions to the processing element 79.

Execution of the retrieval application 99 retrieves the selected set of audio data 96 from CD 23 based on the inputs provided by the user and the organizational structure information 59. If the selected set of audio data 96 is compressed, then the retrieval application 99 invokes the decompression application 56 during execution to decompress the selected set of audio data 96. Once the retrieval application 99 retrieves the data from the selected set of audio data 96 and converts this data into a form compatible with audio output device 94, if necessary, the retrieved data is transmitted to the audio output device 94. In response, the audio output device 94 produces sounds based on the data retrieved from the selected set of audio data 96.

Since retrieval of the selected set of audio data 96 is performed by retrieval application 99 and decompression application 56, if necessary, it is not necessary for the system manager 102 (or any other component of the device 100) to be aware of or be able to process the data format of the data stored on CD 23. Consequently, many different types of data formats may be used to store the data on CD 23 without affecting the compatibility of the CD 23 with system 100.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A system for processing compressed audio data stored on removable storage media, comprising:

a system manger configured to receive inputs from a user of said system and, in response to said inputs, to read organizational structure information stored on a removable storage medium, said system manager further configured to identify a set of compressed data stored on said removable storage medium based on said inputs and said organizational structure information, said system manager further configured to retrieve instructions from a decompression application stored on said removable storage medium and to transmit said instructions;

a processing element configured to receive said instructions transmitted by said system manager and to execute said instructions, wherein execution of said instructions by said processing element decompresses said set of compressed data into uncompressed data; and an audio output device configured to receive said uncompressed data and to produce sound based on said uncompressed data.

2. The system of claim 1, wherein said removable storage medium is a compact disc.

3. The system of claim 1, wherein said organizational structure information includes data defining a location of said decompression application.

4. The system of claim 1, wherein said set of compressed data defines a song.

5. The system of claim 1, wherein said decompression application employs a security feature to prevent unauthorized access of said set of compressed data.

6. The system of claim 1, wherein said set of compressed data defines a plurality of songs.

7. The system of claim 6, wherein said organizational structure information includes at least one play list indicating a correspondence between said plurality of songs.

8. The system of claim 1, further comprising:

a compiler configured to receive said instructions and to translate said instructions into a form compatible with said processing element.

9. The system of claim 8, further comprising:

a second processing element configured to receive instructions from said compiler and dedicated to executing said instructions received from said compiler.

10. A system for processing compressed audio data stored on removable media, comprising:

means for receiving a removable storage medium;

means for receiving inputs from a user interface device;

means for reading organizational structure information stored on said medium;

means for retrieving a set of compressed data from said medium based on said inputs and said organizational structure information;

means for retrieving a decompression application from said medium;

means for decompressing said set of compressed data via said decompression application to produce uncompressed data; and means for producing sound based on said uncompressed data.

11. A method for processing compressed audio data stored on compact discs, comprising the steps of:

receiving a removable storage medium;

receiving inputs from a user interface device;

reading organizational structure information stored on said medium;

retrieving a set of compressed data from said medium based on said inputs and said organizational structure information;

retrieving a decompression application from said medium;

decompressing said set of compressed data via said decompression application to produce uncompressed data; and producing sound based on said uncompressed data.

12. The method of claim 11, wherein said removable storage medium is a compact disc.

13. The method of claim 11, further comprising the steps of:

determining a location of said decompression application based on said organizational structure information; and performing said retrieving said decompression application step based on said determining step.

14. The method of claim 11, wherein said decompressing step further includes the step of employing a security feature to prevent unauthorized access of said set of compressed data.

15. The method of claim 11, further comprising the steps of:

analyzing said organizational structure information; and identifying said set of compressed data based on said analyzing step.

16. The method of claim 15, wherein said set of compressed data defines a song.

17. The method of claim 15, wherein said set of compressed data defines a plurality of songs.

18. The method of claim 17, wherein said analyzing step further includes the step of:

analyzing at least one play list included within said organizational structure information, said at least one play list indicating a correspondence between said plurality of songs.

19. The method of claim 15, further comprising the step of:

compiling said decompression application subsequent to said retrieving step and prior to said decompressing step.

20. The method of claim 19, further comprising the step of:

performing said compiling step via a processing element dedicated to compiling decompression applications stored on removable storage media.

* * * * *